United States Patent
Wang et al.

(10) Patent No.: US 6,957,074 B2
(45) Date of Patent: Oct. 18, 2005

(54) APPARATUS, AND AN ASSOCIATED METHOD, FOR RESERVING RESOURCES IN A MOBILE COMMUNICATION SYSTEM THROUGH THE USE OF HISTORICAL INDICIA

(75) Inventors: Shu-Shaw Wang, Arlington, TX (US); Amiya Bhattacharya, Arlington, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/331,181

(22) Filed: Dec. 26, 2002

(65) Prior Publication Data

US 2004/0192341 A1 Sep. 30, 2004

(51) Int. Cl.[7] ................................................. H04Q 7/20
(52) U.S. Cl. .................. 455/456.1; 455/436; 455/450; 455/452.1
(58) Field of Search ................................ 455/436, 437, 455/438, 444, 439, 440, 441, 456.1, 456.5, 456.6; 370/331, 330

(56) References Cited

U.S. PATENT DOCUMENTS

| | | | | | |
|---|---|---|---|---|---|
| 5,572,221 | A | * | 11/1996 | Marlevi et al. | 342/452 |
| 5,884,147 | A | * | 3/1999 | Reudink et al. | 455/67.11 |
| 6,385,454 | B1 | * | 5/2002 | Bahl et al. | 455/450 |
| 6,696,992 | B1 | * | 2/2004 | Chu | 341/67 |

* cited by examiner

*Primary Examiner*—Temica Beamer
(74) *Attorney, Agent, or Firm*—Federico Fraccaroli (57) ABSTRACT

Apparatus, and an associated method, for facilitating resource allocation in a mobile communication system. Historical indicia associated with a mobile station is monitored and maintained. A predictor forms a prediction of a subsequent path of travel of the mobile station responsive to the historical indicia that is collected and maintained at the memory element. The predicted path of travel of the mobile station is utilized in the allocation of communication resources to the mobile station. Updates are made to the predicted path of travel, and reallocation of the communication resources is correspondingly made, thereby to efficiently utilize the communication resources available in the communication system.

17 Claims, 5 Drawing Sheets

APPARATUS, AND AN ASSOCIATED METHOD, FOR RESERVING RESOURCES IN A MOBILE COMMUNICATION SYSTEM THROUGH THE USE OF HISTORICAL INDICIA

The present invention relates generally to a manner by which to facilitate reservation of resources required to permit the effectuation of a communication service with a mobile station that travels between cells of a cellular, or other radio, communication system. More particularly, the present invention relates to apparatus, and an associated method, by which to predict, based upon evaluation on historical indicia, subsequent movement of the mobile station.

Responsive to the prediction, resources are selectably reserved at one, or more, likely target cells, into which the mobile station is predicted to travel, and, as updated routing information of movement of the mobile station becomes available, the prediction of the subsequent movement is updated, and renegotiation of the resource allocation is performed. Dynamic allocation of communication resources of the communication system is provided, thereby permitting efficient utilization of the resources. Better assurances are also provided that resources are made available to permit the effectuation of the communication service with the mobile station, at a desired QoS (Quality of Service) level, as the mobile station moves between cells of the mobile communication system.

BACKGROUND OF THE INVENTION

Communication of data is effectuated in a communication system between a sending station and a receiving station. Communication of the data between such communication stations is regularly a necessary aspect of modern society. The need to communicate data through the use of a communication system shall also likely continue in the future to be essential. Various different types of communication systems have been developed and utilized to communicate data pursuant to various types of communication services.

With advancements in communication technologies, new types of communication systems have been made possible. That is to say, new types of communication systems have been developed and implemented that make use of such advancements in communication technologies. New types of radio communication systems, for instance, that make use of the advancements in communication technologies have been developed and implemented, and, improvements to existing types of radio communication systems have been implemented that also make use of such advancements in communication technologies.

A radio communication system differs with a conventional, wire line communication system in that a communication path, which extends between the sending and receiving stations, includes, at least along a portion thereof, a radio link. Radio channels are defined upon the radio link, and, at least for that portion of the communication path, that is communicated during operation of the communication system, data is communicated upon one or more of the defined radio channels. That is, a radio link is substituted for a wire line connection, thereby obviating the need for a wire line connection for that portion of the communication path.

Use of a radio communication system provides for various advantages. Initial installation and deployment costs are generally less than the corresponding installation and deployment costs associated with the installation and deployment of a corresponding, wire line counterpart. Also, a radio communication system can be implemented as a mobile communication system. In a mobile communication system, one, or more, of the communication stations operable therein pursuant to a communication session are permitted mobility.

A cellular communication system is a mobile communication system. The network infrastructures of cellular communication systems have been installed over significant portions of the populated areas of the world and are popularly utilized to effectuate both voice and data communication services. Various cellular communication standards have been promulgated, and cellular communication systems that are operable pursuant to various of such cellular communication standards have been installed and implemented. Successive generations of communication standards have been promulgated, and corresponding successive generations of communication systems, have been installed and implemented. Additional, new-generation, cellular communication system standards have been proposed, generally to incorporate improved communication capabilities permitted as a result of communication technology advancements. Installation and implementation of such new-generation systems is anticipated.

The network infrastructures of cellular communication systems include fixed-site, base transceiver stations, positioned at spaced intervals, throughout a geographic area that is to be encompassed by the communication system. Each of the base transceiver stations defines an area, referred to as a cell. When a mobile station, operable in the communication system, is positioned at a location within the area defined by the cell, radio communications with the mobile station are generally possible. Because the mobile station is mobile, the mobile station might initially be positioned in a first cell, referred to as a serving cell, and thereafter moved therefrom. When moved out of the serving cell and into another cell, referred to as a target cell, handover of communication with the mobile station from the base station encompassing the serving cell to the base station encompassing the target cell permits continued communications with the mobile station.

Resources must be available at the target cell for the handover to be successful. That is to say, for the communication service to continue to be effectuated between the mobile station and the network infrastructure of the communication system, an appropriate level of resources must be available for allocation to the mobile station. New-generation, cellular communication systems generally provide for a QoS (Quality of Service) parameter. The QoS parameter defines, according to a quality criteria, a quality level at which a communication service is to be performed. Effectuation of the communication service at a desired QoS level is achieved, at least in substantial part, by allocation of appropriate levels of communication resources to effectuate the communication service. As communication resources available at the target cell might be limited, early reservation of the communication services better assures that the communication resources shall be available to permit continued effectuation of the communication service at a desired quality of service level.

However, early reservations for communication resources at the target cell requires early determination of which potential target cells shall be the resultant target cell at which the communication resources should be reserved. Also, as communication resources might be required to be allocated at successive cells in the path of travel of a mobile station during a communication session, communication resources might well have to be allocated at such corresponding number of cells. A single i.e., one-shot, resource negotiation and allocation might well not be appropriate. A one-shot procedure is unable to take into account changing conditions, and changing resource requirements, subsequent to the single negotiation and resource negotiation.

Any manner by which to predict better the cells at which communication resources shall need to be reserved shall facilitate improved communications, permitting both more efficient allocation of communication resources and improved communications in the communication system.

In light of this background information related to communications in a cellular, or other mobile, communication system that the significant improvements of the present invention have evolved.

SUMMARY OF THE INVENTION

The present invention, accordingly, provides apparatus, and an associated method, by which to facilitate reservation of resources required to permit effectuation of a communication service with a mobile station that travels between cells of a cellular, or other mobile, communication system.

Through operation of an embodiment of the present invention, a manner is provided by which to predict, based upon evaluation of historical indicia, subsequent movement of the mobile station. Once the prediction of the subsequent movement of the mobile station is made, the resources are selectably reserved at target cells positioned in the path of the predicted, subsequent movement. Communication resource allocations are made at one, or more, likely target cells. As updated, routing information becomes available of additional movement of the mobile station, the prediction of the subsequent movement of the mobile station is updated. Reallocation of communication resource allocation is selectably further made. The resource reallocation is made, for instance, as a result of a service allocation renegoation.

The communication resources available to the communication system are dynamically allocated. Efficient utilization of the resources is thereby permitted. Also, better assurances are provided that resources are made available to permit the effectuation of the communication service with the mobile station, at a desired Quality of Service (QoS) level, as the mobile station moves between cells of the mobile communication system.

In one aspect of the present invention, historical routing indicia associated with the movement history of the mobile station is maintained. Predictions of subsequent movement of the mobile station are made, at least in part, responsive to the historical routing indicia. The mobility behavior of the mobile station is possible to predict through the monitoring of the movement of the mobile station and detection of reappearance of movement patterns.

In another aspect of the present invention, predictions are made through the use of a variable-to-fixed coding and decoding technique. The technique that is utilized is, for instance, a Lempel-Ziv technique. Through the use of such a technique, successively longer blocks of data are encoded by incrementally parsing a data stream into variable length blocks. Each block is expressed as a concatenation of a prefix and a single symbol such that the prefix previously appeared as a data block somewhere previously. Encoded, as well as decoded blocks, are stored in a dictionary for such type of matching. The dictionary operates adaptively to capture the pattern embedded in the data stream.

Predictions of subsequent movement of the mobile station are made based upon both the historical routing indicia and incremental updates thereof. A path-update protocol is formed as a result. A mobile-station, future path prediction scheme is provided for early communication-channel reservation at a target cell, or cells, based upon a Lempel-Ziv update algorithm that forms an encoder-decoder set.

The encoder portion is embodied at, for instance, the mobile station and operates to intercept any combination of a primitive dynamic update, i.e., a distance, movement, or time-based indicia in which, e.g., cell-location identifiers and their corresponding time-stamps and time-durations, as input symbols. The decoder portion is embodied at the mobile station or elsewhere, such as at the network part of the communication system. The decoder portion operates to decode the encoded symbol structure back into an original symbol sequence, and the relative frequencies, together with associate with time-stamps, are updated.

In another aspect of the present invention, an updated prediction of the subsequent path of movement of the mobile station is made upon detection of a handover of communications between cells of the communication system and the newly-predicted, subsequent path of movement is utilized to renegotiate resource allocation for communication channels in one or more target cells. If the updated predicted path of movement requires a change in resource allocation, a service allocation renegotiation is performed, selectively to reallocate the communication resources in a manner best to assure that the communication resources are available to permit continued effectuation of a communication service when the mobile station travels along a path into a subsequent cell.

The predictions of subsequent paths of movement of a plurality of mobile stations are also selectively monitored at a network device and, responsive to such monitoring, allocation of communication resources, based upon the predicted paths of movement of the plurality of mobile stations, is carried out.

Thereby, an early channel reservation scheme is provided. The scheme utilizes a continuous mobility prediction scheme based upon handover acknowledgments to facilitate accurate prediction of subsequent demand for communication resources in the cells of the communication system. And, the scheme also utilizes a service renegotiation scheme that permits dynamic allocation of the communication resources of the communication system responsive to dynamically changing communication resource requirements.

In these and other aspects, therefore, apparatus, and an associated method, is provided for a radio communication system having a plurality of spaced-apart, fixed-site transceivers positioned throughout a geographic area. Each fixed-site transceiver defines a coverage area within which communications with a mobile station are permitted pursuant to a communication session in which communication resources are allocated to effectuate the communication session. Allocation of communication resources by at least one target, fixed-site transceiver is facilitated. A mobility path predictor is adapted at least to receive historical routing indicia associated with movement of the mobile station. The mobility path predictor predicts a subsequent path of movement of the mobile station based upon the historical routing indicia. A resource requestor is adapted to receive indications of the subsequent path of movement predicted by the mobility path predictor. The resource requestor selectively requests reservation of the communication resources at the at least one target, fixed-site transceiver to permit effectuation of the communication session. The at least one target, fixed-site transceiver defines a coverage area containing at least a portion of the subsequent path of movement predicted by the mobility path predictor.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION OF THE PREFERRED EMBODIMENT

Figure 1:
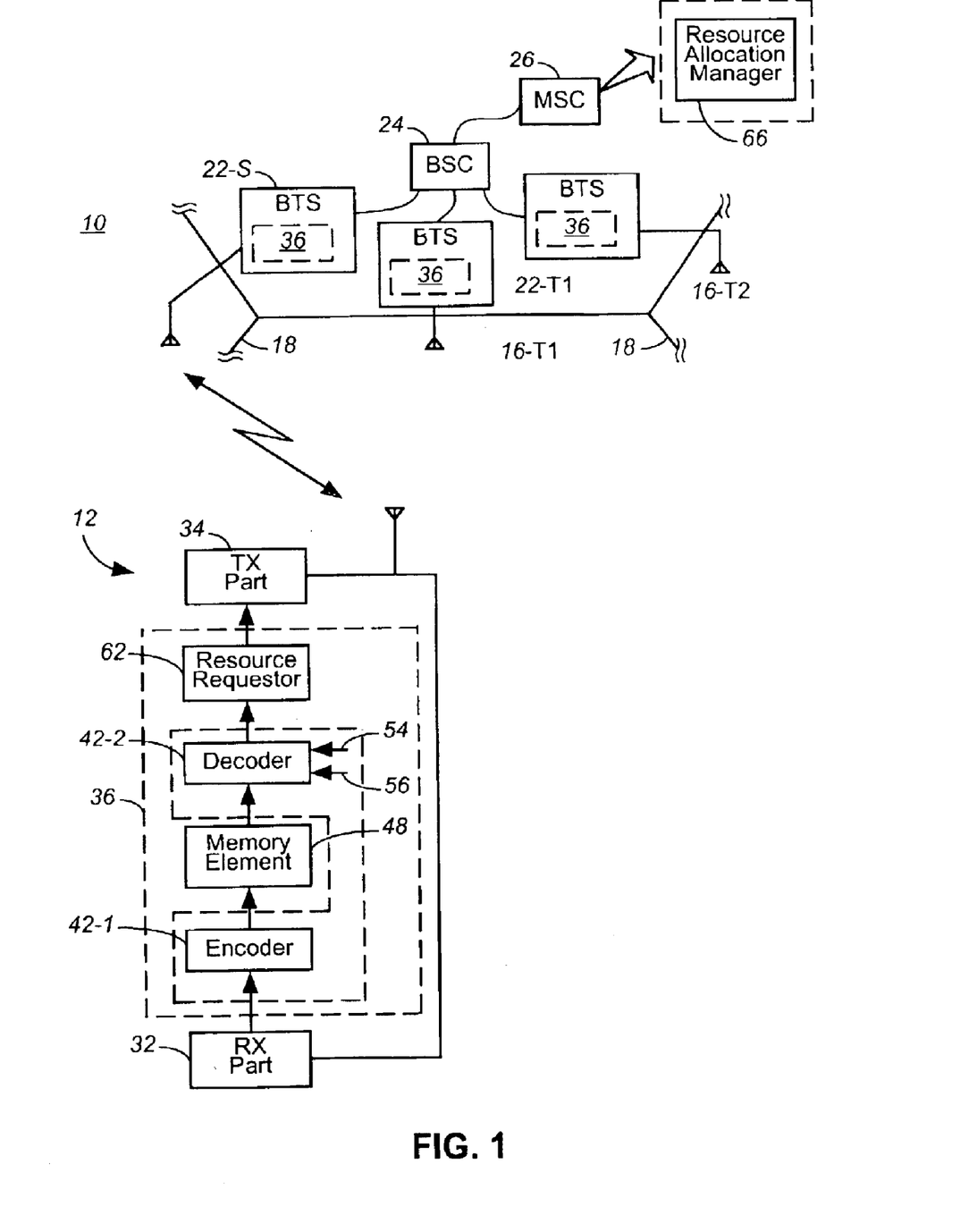
FIG. 1 illustrates a functional block diagram of a communication system in which an embodiment of the present invention is operable by which to allocate communication resources through effectuate a communication service based upon mobility prediction and service renegotiation.

Referring first to FIG. 1, a portion of a cellular communication system, shown generally at 10, provides for radio communications with mobile stations, of which the mobile station 12 is exemplary. The communication system includes a network infrastructure that is installed throughout a geographical area that is to be encompassed by the communication system. During operation of the communication system, communication of data between a mobile station and the network infrastructure of the communication system is effectuated pursuant to a communication service.

In the exemplary implementation, the mobile communication system forms a cellular communication system that conforms with an operating specification promulgated by an appropriate standards-creating organization. For instance, the mobile communication system is operable pursuant to a GSM (Global System for Mobile Communications) cellular communication system or a new-generation successor thereto, such as a GSM/3GPP (Global System for Mobile Communications/3$^{rd}$ Generation Partnership Project) system. Other cellular, as well as other mobile radio, communication systems are analogously represented, and an embodiment of the present invention is analogously implementable in such other communication systems.

The system 10 defines a plurality of regions, referred to as cells 16. Here, portions of three of such cells, cell 16-S, 16-T1, and 16-T2 are shown. The cell 16-S forms a serving cell in which the mobile station is initially positioned, and the cells 16-T1 and 16-T2 are representative of target cells to which communication handovers shall likely be subsequently performed, and are in a predicted path of travel of the mobile station. Here, boundaries 18 separate the separate cells and, when the mobile station travels between cells, i.e., through a boundary 18, a handover of communication is effectuated to facilitate continued communications with the mobile station.

A Base Transceiver Station (BTS) 22 defines each of the cells 16. Here, a Base Transceiver Station 22-S is associated with, and defines the cell 16-S, a Base Transceiver Station 22-T1 is associated with, and defines, the cell 16-T1, and the Base Transceiver Station 22-T2 is associated with, and defines, the cell 16-T2. The Base Transceiver Stations 22 are formed of fixed-sites radio transceivers that are capable of two-way commun mobile station, such as the mobile station 12. Data is communicated between a mobile station and an appropriate based transceiver station by way of radio channels formed upon radio links defined between the mobile station and a base transceiver station.

Each of the base transceiver stations 22 are coupled to a Base Station Controller (BSC) 24, and the Base Station Controller, in turn, is coupled to a Mobile Switching Center (MSC) 26. Groups of base transceiver stations are coupled to a single base station controller, and groups of base station controllers are coupled to a single mobile switching center. Additional structure of the network portion of the mobile communication system is, for purposes of simplicity, not separately represented in the figure. Either entities, both physical and functional, can, of course, also be shown to form part of the mobile communication system.

As just-noted, when a mobile station travels out of one cell and into another cell, a handover of communication is generally performed to permit continued communications with a mobile station, such as pursuant to a communication service, e.g., as a multi-media service. To perform a handover of communications, communication resources must, however, be available at the target cell to be allocated for the continued communications with the mobile station. If the resources are not available, continued communications with the mobile station are degraded or terminated. Conventionally, either a best-efforts allocation is attempted, or a one-shot service negotiation is performed. That is, even if a early-reservation procedure is utilized, conventionally, only a single allocation is performed. Dynamic reallocation of the allocated resources is not performed. As a result, communication resources might be allocated in a less than ideal manner, thereby limiting the efficiency of utilization of the communication resources of the communication system and, also, potentially limiting the effectuation of the communication service with the mobile station.

The mobile station includes a receive part 32 and a transmit part 34 operable, respectively, to receive and transmit signals with the network infrastructure of the communication system. The portions 32 and 34 of the mobile station are operable generally pursuant to the operational parameters set forth in the operational specification pursuant to which the communication system is constructed to be operable.

The mobile station further includes apparatus 36 of an embodiment of the present invention. The elements here shown to form the apparatus 36 embodied at the mobile station are functionally represented and, the functions performed by such elements can be implemented in any desired manner. In the exemplary implementation, the functions performed by such elements are embodied at algorithms executable by processing circuitry. In other implementations, the functions are performed in other manners. And, the physical elements at which such functions are performed in various implementations are physically embodied, in whole or in part, at the receive or transmit portions 32 and 34, or elsewhere, such as at the network part of the communication system.

Also, while the exemplary implementation shows the functional elements of the apparatus 36 to be embodied at the mobile station, in another implementation, portions of the apparatus 36 are embodied at the base transceiver stations 22, as indicated, or elsewhere at the network part. While the following description of operation of the apparatus describes operation of the apparatus 36 embodied at the mobile station, the elements of the apparatus 36 are, in another implementation, instead positioned at the network part and the data that is provided to the apparatus 36 directly by the receive part 32 is instead sent by way of a radio channel when the application is implemented at the network part.

The apparatus includes a path predictor 42 here formed of a first part 42-1 and a second part 42-2. The first part 42-1 formed an encoder that is coupled to the receive portion 32, here by way of the line 44. Historical indicia associated with the mobile stations is provided to the encoder. The historical indicia includes the position of the mobile station, a timestamp associated with the position of the mobile station, and a duration indicia. Such historial indicia is, for instance, broadcast, or otherwise transmitted to the mobile station. Or, the indicia is determined at the mobile station.

The predictor 42 forms, in the exemplary implementation, a Lempel-Ziv data compression and decompression algorithm. The encoder 42-1 operates to encode, here to compress the indicia provided thereto on the line 44 and to provide encoded indicia to a memory element 48. The memory element 48 stores the encoded information to form a data tray 52.

In the exemplary implementation, the encoder operates to collect the historical indicia while the mobile station is in an idle mode, and the encoded data stored at the memory element 48 is stored while the mobile station is in the idle mode.

The second portion 42-2 of the predictor forms a decoder that is coupled to the memory element 48 to access contents of the compressed indicia stored thereat. The decoder is selectively operable to access the contents of the memory and to predict a subsequent path of travel of the mobile station based upon the historical indicia together with the current location of the mobile station here as shown to be provided to the decoder, also by way of the line 44. Lines 54 and 56 extending to the decoder are representative of additional inputs to the decoder, here inputs indicating that the mobile station has crossed a cell boundary and a time indication indicating that a selected time interval has timed-out, respectively. In the exemplary implementation, the detector operates to form a prediction of the subsequent path of travel of the mobile station when the mobile station crosses a cell boundary, such as a cell boundary 18, or a designated time period has expired.

Once the prediction is made, a resource requestor 62 operates to generate a request for allocation of resources to the mobile station to permit continued effectuation of a communication service at a desired quality of service level when the mobile station travels along the predicted path. The request is provided to the transmit portion and the request is transmitted to the network part of the communication system. Once delivered to the network part, the request is routed through the network part to a resource allocation manager 66. The resource allocation manager also forms a portion of the apparatus 36 of an embodiment of the present invention. Here, the resource allocation manager is embodied at, or is associated with the mobile switching center 24. In other implementations, the resource allocation manager is positioned elsewhere. The resource allocation manager responds to the request with a resource allocation that completely fulfills, partially fulfills, or denies the request. The resource allocation is predicated upon the historical indicia collected by the mobile station, thereby to provide a manner by which to allocate resources based upon historical movement of the mobile station. As the mobile station travels between cells, or otherwise, updated predictions are generated and resource reallocations are made, as appropriate.

In other implementations, portions of the apparatus 36, embodied in the exemplary implementation at the mobile station, are instead embodied at the network part of the communication system. For instance, historical indicia collected at the mobile station, and another implementation, is stored at a network memory element, instead of the memory element 48. And, the decoder, in another implementation, is also embodied at the network part rather than at the mobile station. In such implementations, the resource requestor is also embodied at the network part.

In an implementation of an embodiment of the present invention, observation is made that the movement patterns of a user are reflections of daily, or other, routines. This routine nature of mobility behavior is reflected as the stationary and symbolic capture of historical indicia, such as cell identifiers of the sequence of cells through which a mobile station travels. Moreover, when such a symbol sequence is ergodic, a user mobility profile is identified as a k-th order Markov source, for some source-specific k that is unknown in advance. The Markov source is approximated by following, and learning from, the patterns of the historical movement of the mobile station indicated by the historical indicia. That is to say, it is possible to predict the mobility behavior of the mobile station when the patterns reappear. The mobile prediction concept is motivated, in part, through the use of optimal data compression schemes. Through data compression via a compressor, the compressor must be able to predict future data while in order effectively to compress a stream of data. A good data compressor typically is a good predictor.

In data compression, a data stream is decomposed into a sequence of blocks that are individually encoded, typically using as few bits as possible. Fixed-to-variable encoding techniques, such as Huffman coding technique, map frequently occurring blocks into codes with fewer bits, and leave the longer codes aside for infrequent blocks. Each encoded block corresponds to an update messaging by way of registration. These schemes affect only the average size of the update message. However, in this type of encoding technique, protocol overhead of registration outweighs such benefits due to the size of the message that is required. In contrast, a variable-to-fixed encoding technique, such as the Lempel-Ziv data compression method, encodes successively longer and longer blocks of data into a reasonably fixed-size encoding. The number of registrations that are required is potentially reduced, permitting successive update messages to be of richer content.

A type of Lempel-Ziv algorithm, referred to as an LZ78 algorithm, is a variable-to-fixed encoding scheme that incrementally parses a data stream into variable length blocks. Each block is expressed as the concatenation of a prefix and a single symbol such that the prefix must have previously appeared as a block. Encoded, as well as decoded, blocks are stored in a dictionary for such type of matching. The dictionary adaptively captures the pattern embedded in the stream itself, making this algorithm universal. As the universal mobility model or the user has little left to assume, an analysis permits learning and building upon the model based upon the past, i.e., historical, observations, using an incremental parsing technique, such as that used during execution of the LZ78 algorithm. Using this comment is possible to design a cost-effective, path-update protocol, as contrasted to a position update protocol. As a result, the mobile future path prediction that is used to request early channel reservation is embodied in the exemplary implementation, as an encoder-decoder set. The encoder portion, here the encoder 42-1, intercepts any combination of primitive dynamic updates, in terms of distance, movement, or time, etc., treating the cell identifiers and their corresponding time-stamp and time-durations as input symbols. The coded update message is provided to the decoder, e.g., by way of the memory element 48, resident at the mobile station or at the network portion, depending upon the implementation. The decoder operates to decode the encoded symbol structure back into the original symbol sequence and updates relative frequencies along with the time-stamp.

The relative frequencies and time-stamps of such trips depend upon the life style of the user of the mobile station. When translated into a symbolic domain, a trip appears as a phrase of symbols together with type-stamps. The movement history of a mobile station is represented as a string of symbols taken from an alphabet. The alphabet forms a set of cells under a service area and the symbols denote the cell identifiers reported by updates. The symbols of the string of symbols are not necessarily distinct. The historical indicia form a profile of the mobile station.

Figure 2:
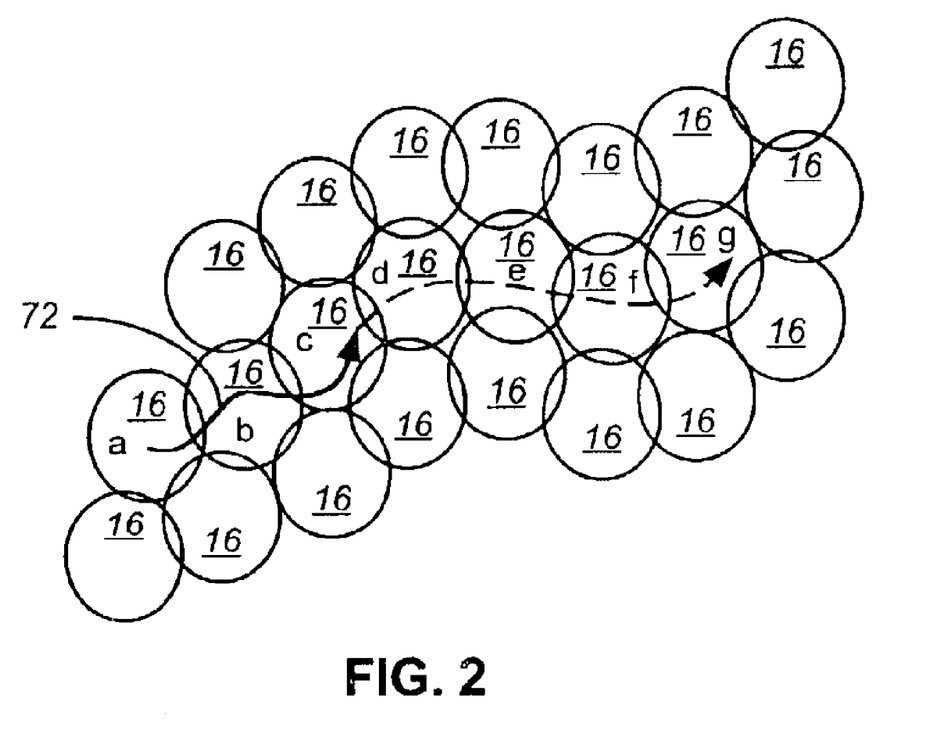
FIG. 2 illustrates an exemplary path of travel of a mobile station through cells of a cellular communication system, which the communication system shown in FIG. 1 is representative.

FIG. 2 illustrates a plurality cells 16 and a path 72 of travel of a mobile station through certain of these cells. The portion of the path 72 shown in solid line indicates past positioning of the mobile station and the portion of the path 72 shown in dash indicates a predicted, subsequent path of travel of the mobile station. The mobile station is presently positioned in the cell 16-C. The cell 16-C forms a serving cell, and cells 16-D, 16-E, 16-F, and 16-G form target cells.

Figure 3:
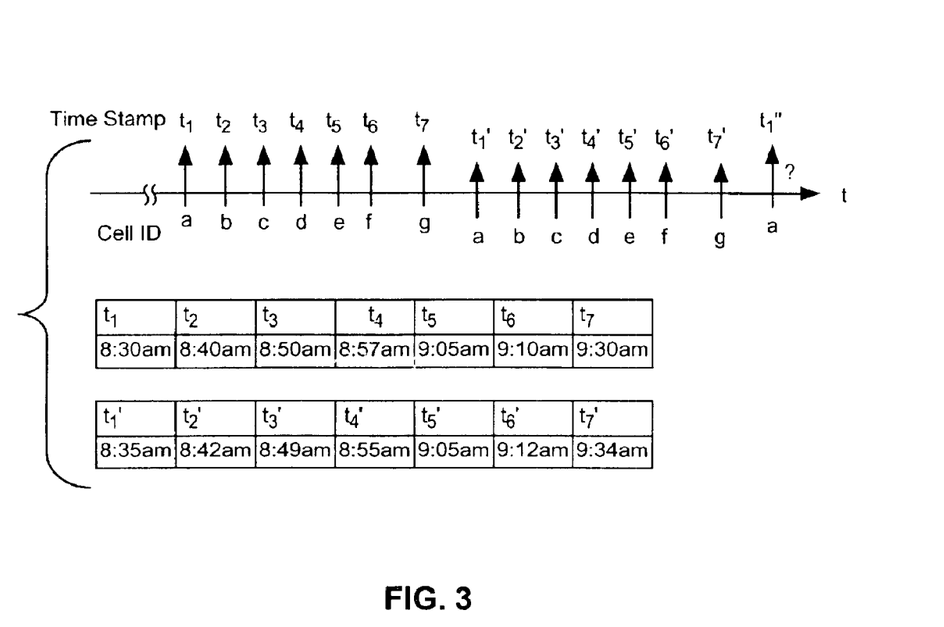
FIG. 3 illustrates a representation of the generation of historical indicia associated with the mobile station as the mobile station travels along the path indicated in the illustration shown in FIG. 2.

FIG. 3 is associated with FIG. 2 and illustrates historical indicia associated with the path of travel of the mobile station. The figure illustrates time-stamps at times $t_1$ through $t_7$ taken at the cell-crossing points between successive ones of the cells 16 during previous paths of travel and, the time-stamps $t_1't_7'$ are representative of time-stamps at the cell-crossing boundaries at a subsequent Time. Additional time-stamps can analogously be represented, and a table is associated with the graphical representation, here indicating the time-stamps at the times t. Time-durations in the cells are readily determinable from the time-stamp information.

Figure 4:
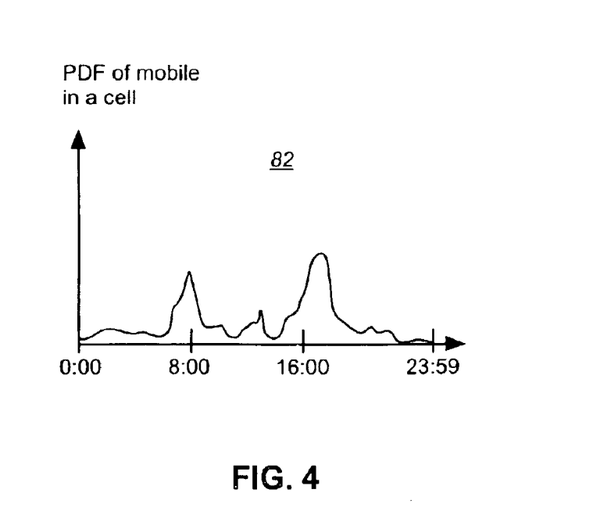
FIG. 4 illustrates a graphical representation of an exemplary probability density function indicating historical indicia, here a mobile time-stamp, plotted as a function of a time-of-day.

The graphical representation of FIG. 4 illustrates a probability density function, shown generally at 82, that is formed of an accumulation of historical indicia. Here, the probability density function is formed as a function of the time-stamp of a mobile station resident in a particular cell 16. Analysis of the distribution indicates that the mobile station is resident in the cell with greatest frequency at the hours of 8 o'clock and 5 o'clock.

Figure 5:
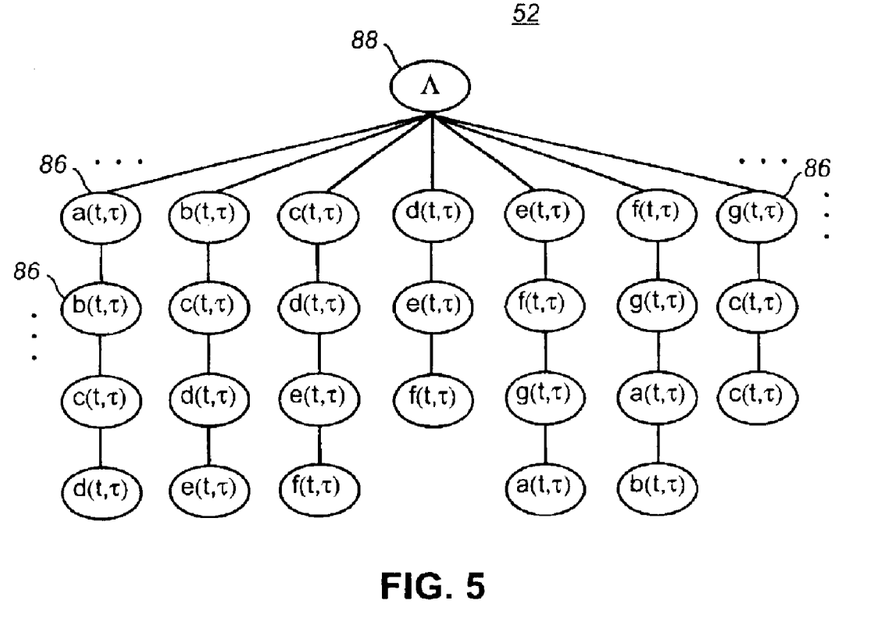
FIG. 5 illustrates a functional representation of an exemplary tree structure of historical indicia formed pursuant to operation of an embodiment of the present invention.

FIG. 5 illustrates an exemplary tree 52 formed pursuant to operation of the apparatus 36, and maintained at the memory element 48. The tree forms a location-time dictionary database. The tree is a symbol-wise context model corresponding to the incremental parse tree of the a LeZi-update. Each node 86 of the tree except for the root 88 preserves the frequencies and their corresponding time-stamps and time-durations. Such information can be used to compute total probabilities of context as well as conditional probabilities of the symbols, based upon a given context. That is to say, the predicted, subsequent path of the mobile station can be computed, making use of the total probabilities of contexts formed through analysis of the node values.

During operation of an embodiment of the present invention, continuous, i.e., repeated mobility predictions are made responsive to the determined context.

The mobility prediction is based, in the exemplary implementation, not only through the use of a most-recent LeZi-update of the previous path of the mobile station to predict the heading of the mobile station, but also to utilize the current path of the mobile station to enhance the prediction of the future path of the mobile station. In the formation of a new prediction, determined, e.g., when the mobile station enters a new cell and receives indication of a handoff to the new cell, the newly-predicted subsequent path of travel of the mobile station is used in a request for reallocation of communication resources. Because the predicted path is dynamically updated, the estimated communication resource requirements are more accurately estimated, thereby to utilize more efficiently the communication resources available in the communication system.

When the mobile station initially requests a communication session through which to effectuate a communication service, the resource allocation manager makes use of the predicted, subsequent path of travel to negotiate with the mobile station to determine session admission and channel assurance. When the mobile station moves, successively, to one or more other cells, the predictor of the mobile station recalculates the path of subsequent travel of the mobile station, and the update prediction, together with a request for resource reservation, is reported back to the network. The network is thereby informed of a current path prediction of the mobile station and renegotiation of service parameters is commenced, if appropriate. By updating the predicted path of travel, the accuracy of the predicted path is repeatedly improved. Service renegotiations to allocate to the mobile station appropriate communication resources is thereby made more precisely.

Figure 6:
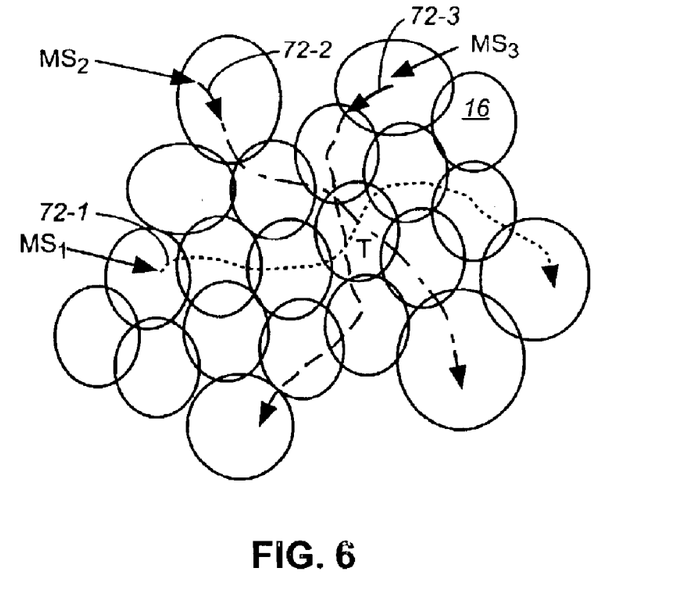
FIG. 6 illustrates a functional representation of the paths of travel of a plurality of mobile stations operable in a mobile communication system, such as the mobile communication system shown in FIG. 1.

Additionally, and as indicated in FIG. 6, the predicted paths of travel 72-1, 72-2, and 72-3 are representative of predicted paths of travel of a plurality of mobile stations operable in a mobile communication system. The predicted paths of travel of each of the plurality of mobile stations is used in the determination of whether to allocate resources, and in what amounts, to different ones of the mobile stations. Service renegotiation with the mobile stations, based upon the QoS requirements of the different mobile stations and the communication services performed therewith, together with confidence levels of the predicted movements, are all utilized in the resource allocations.

For example, a mobile station routinely travels through "abcdefg" cells. Therefore, a symbol sequence "abcdefg abcdefg abcdefg abcdefg abcdefg abcdefg abcdefg abcdefg ab . . . " gets parsed as "a, b, c, d, e, f, g, ab, cd, ef, ga, bc, de, fg, abc, def, gab, cde, fga, bcd, efg, abcd, efga, bcde, fgab, cdef, ga . . . " by the LeZi-update encoder 42-1, where commas indicate the points of updates, separating the updated path segments. The symbol sequences (actually user path segments) can easily be maintained, such as the tree shown in FIG. 5, in which all the relevant history (cell-ID along with time-stamp and time-duration within the cell) of the user is captured in a compact form. In addition to representing the dictionary, the trees can store statistics for contexts explored, resulting in a symbol-wise model.

Underlying principles behind the probability assignments are motivated by the principles used in the PPM (prediction by partial match) family of text compression schemes. However, while the PPM techniques for text compression are concerned with the probability of the next symbol, here the interest in the probability of occurrence of the symbols (or cells) on the path segment to be reported by the next update. These segments are the sequences of cells generated when traversing from the mobile's current serving cell to the leaves of the sub-tree representing the current context. The estimated conditional probabilities for all of the cells at the current context constitutes the conditional probability distribution, based on which cell paths are ranked for channel reservation. Instead of relying completely on the conditional probability estimates given the context of a specific order, a PPM-style blending of these distributions is desirable in Table 1.

From the example, the symbols are parsed as follows "a, b, c, d, e, f, g, ab, cd, ef, ga, bc, de, fg, abc, def, gab, cde, fga, bcd, efg, abcd, efga, bcde, fgab, cdef, ga . . . ", the last LeZi-update path is "cdef" and the current location path is "ga". Therefore, Successive Path Prediction method will use this given phrase "cdefga" to predict the most likely mobile's future path. The prediction results are shown in Table 1.

TABLE 1

Probabilistic prediction of cells in the path ("cdefga")

| Phrase | Pr[Phrase] | Normalized Pr |
|---|---|---|
| b | $1/3 + 2/3\{2/5 + 2/5(3/10)\} = 0.72$ | 0.9 |
| bc | $2/3 * 3/5 * 1/10 = 0.04$ | 0.05 |
| bcd | $2/3 * 3/5 * 1/10 = 0.04$ | 0.05 |

Table 1 shows that the path "b" has a 90% probability and the path "bc" and "bcd" has 5% probabilities. If a threshold of 95% prediction probability is required, the path "b" and path "bc" are both needed for channel reservation. In this simple case, since path "b" is included in path "bc", path "bc" needs to be reserved. Once the mobile moves to a new cell (e.g., into the "b" cell), a predictive movement tracking process will occur. Table 2 is the new probability of channel reservation prediction based on the movement tracking. If the ping-pong effects occur during the handover, it can be reduced, based on increase handoff timer to reduce the cell ping-pong effects. This is because ping-pong effects will increase the redundant computation of the path prediction.

TABLE 2

Probabilistic prediction of cells in the path ("cdefgab")

| Phrase | Pr[Phrase] | Normalized Pr |
|---|---|---|
| c | $1/5 + 3/5 * 2/9 = 0.33333$ | 0.4545 |
| cd | $1/5 + 3/5 * 2/9 = 0.33333$ | 0.4545 |
| cde | $3/5 * 1/9 = 0.06666$ | 0.0910 |

Table 2 shows that the path "c" and "cd" both have a 45.45% probability and "cde" has 9.1% probabilities. If we require a threshold of 95% prediction probability, the path "c", "cd", and "cde" are all needed for channel reservation. So, the path "cde" is reserved. When the mobile follow the prediction path and move to "c" cell, a new LeZi-update occurs. Since this "gabc" leave is not in the previous tree structure, it is added into the new LeZi-updates. Thus, the new update phrase "gabc" is added to predict the future mobile path.

TABLE 3

Probabilistic prediction of cells in the path ("gabc")

| Phrase | Pr[Phrase] | Normalized Pr |
|---|---|---|
| d | $1/2 + 1/2 * (2/9 + 2/5 * 3/9) = 0.76666$ | 0.8625 |
| de | $1/2 * 1/5 = 0.1$ | 0.1125 |
| def | $1/2 * 2/5 * 1/9 = 0.02222$ | 0.0250 |

Table 3 shows that the path "d" has an 86.25% probability, path "de" has an 11.25% probability, and "def" has 2.5% probabilities. If a threshold of 95% prediction probability is required, the path "d" and "de" are both needed for channel reservation. So, the path "de" is reserved. When the mobile follows the prediction path and moves to "d" cell, the successive path prediction process will occur again. Thus, the new update phrase "gabcd" is used to predict the future mobile path. This is the fundamental concept of a predictive movement tracking method.

As service renegotiation method will immediately follow the path prediction to update mobile's channel reservation assurance in communication session. Continuous mobility prediction only considers the possible future paths for the mobile in communication session. However, service renegotiation considers how to allocate resource and QoS requirement more effectively based on successive path prediction.

Figure 7:
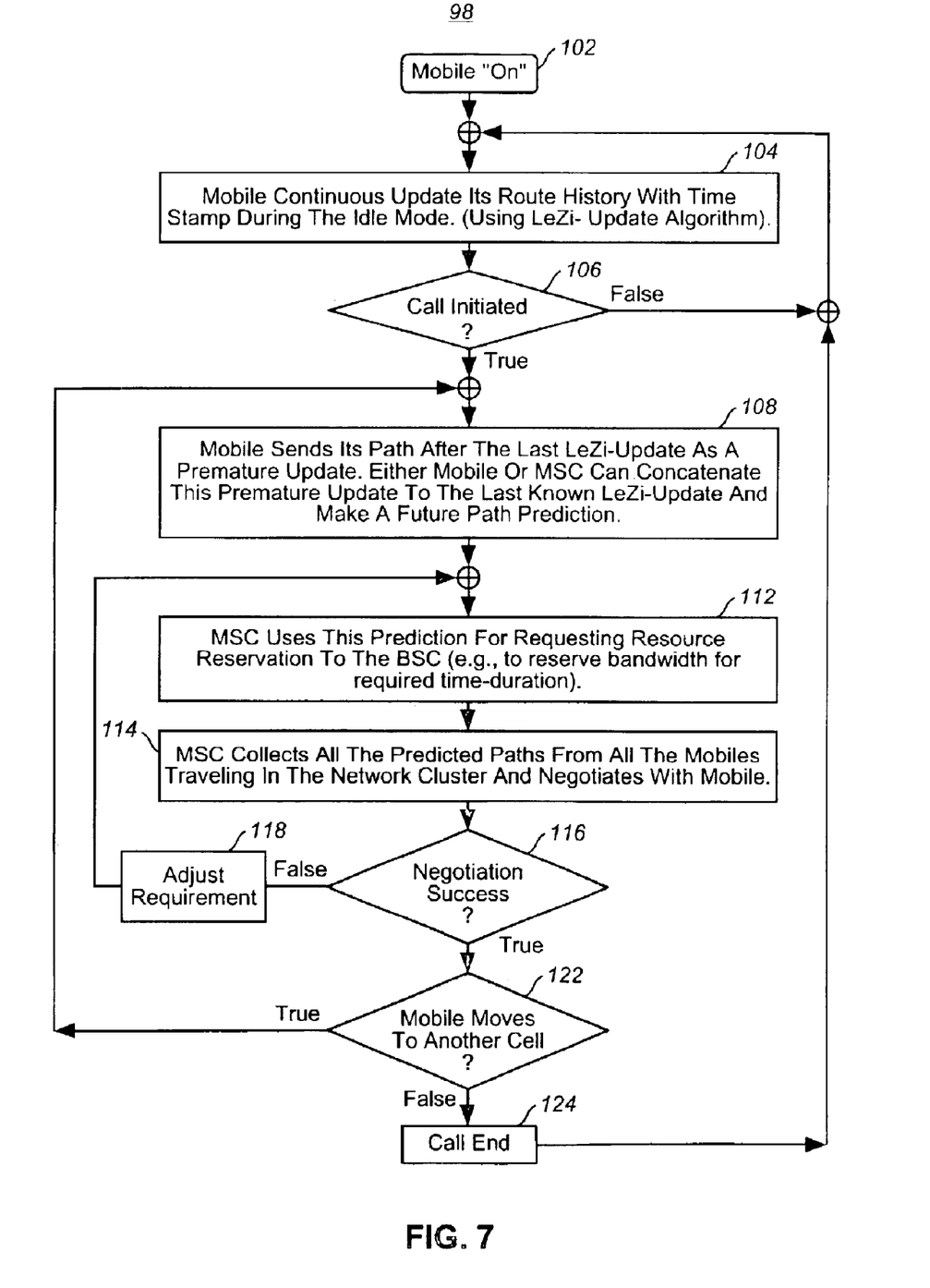
FIG. 7 illustrates a flow diagram illustrating the method of operation of an embodiment of the present invention.

FIG. 7 illustrates a flow diagram, shown generally at 98, representative of an early channel reservation scheme effectuated pursuant to operation of an embodiment of the present invention. First, as indicated by the block 102, the mobile station is powered. Then, as indicated by the block 104, the mobile station continuously updates its route history with historical indicia, such as the cell location in which the mobile station is positioned together with a time-stamp. The LeZi-update algorithm is utilized in the monitoring procedure while the mobile station is in the idle mode.

A determination is made as indicated by the decision block 106, as to whether a call is initiated. If not, the F branch is taken back to the block 104. If, however, a call is initiated, the T branch is taken to the block 108.

At the block 108, the mobile station sends its predicted path of subsequent travel after the most-recent LeZi-update as a premature update. This update is concatenated to a most-recent known, LeZi-update in order to make a future path prediction therefrom. Then, and as indicated by the block 112, the resource allocation manager embodied at the mobile switching center uses the prediction for requesting resource reservation to a base station controller, e.g., to reserve bandwidth for a required time-duration. Then, as indicated by the block 114, the mobile switching center collects all of the predicted paths from all of the mobile stations traveling in a network cluster and negotiates service allocations taking into account the service requirements of the mobile stations.

Thereafter, and as indicated by the decision block 116, a determination is made as to whether the service negotiation was successful. If not, the F branch is taken to the block 118, and the requirement is adjusted and a path is taken back to the block 112. If, conversely, the negotiation was successful, the T branch is taken to the decision block 122. At the decision block 122, a determination is made as to whether the mobile station has moved to another cell. If so, the T branch is taken to the block 108. Otherwise, a F branch is taken to the block 124, indicated to be a call end.

Thereby, a manner is provided by which to allocate communication resources in a mobile communication system responsive to predicted paths of movement of mobile stations operable therein. By predicting the future paths of movement of the mobile stations, efficient allocation of communication resources can be made early and efficiently.

The previous descriptions are of preferred examples for implementing the invention, and the scope of the invention should not necessarily be limited by this description. The scope of the present invention is defined by the following claims.

We claim:

1. Apparatus for a radio communication system including a plurality of spaced-apart, fixed-site transceivers positioned throughout a geographic area, each fixed-site transceiver defining a coverage area within which communications with a mobile station are permitted pursuant to a communication session in which communication resources are allocated to effectuate the communication session, said apparatus for facilitating allocation of communication resources by at least one target, fixed-site transceiver, said apparatus comprising:

an encoder adapted to receive historical indicia associated with movement of the mobile station, said encoder for encoding the historical indicia into compressed form, encoding performed by said encoder forming a variable-to-fixed encoding scheme;

a memory element adapted to receive the historical indicia, once encoded by said encoder;

a decoder adapted to access said memory element to retrieve the historical indicia stored thereat, said decoder for decoding the historical indicia and for predicting a subsequent path of movement of the mobile station, the subsequent path formed of a first part and of a second part, the first part based upon the historical indicia and the second part based upon a current location update; and a resource requestor adapted to receive indications of the subsequent path of movement predicted by said mobility path predictor, said resource requestor for selectably requesting reservation of the communication resources at the at least one target, fixed-site transceiver to permit effectuation of the communication session, the at least one target, fixed-site transceiver defining a coverage area containing at least a portion of the subsequent path of movement predicted by said decoder when the subsequent path of movement is of a prediction probability greater than a selected threshold.

2. The apparatus of claim 1 wherein said encoder is further adapted to receive, at selected intervals, the current location location updates that form part of the subsequent path of movement predicted by said decoder.

3. The apparatus of claim 1 wherein the historical indicia comprises positional indicia identifying positioning of the mobile station.

4. The apparatus of claim 3 wherein the radio communication system comprises a cellular communication station, wherein the coverage area defined by each fixed-site transceiver forms a cell, each cell identified by a cell identifier, and wherein the positional indicia forming the historical indicia includes values of the cell identifier of the cell in which the mobile station is positioned.

5. The apparatus of claim 3 wherein the historical indicia further comprises temporal indicia associated with the positional indicia that identifies the positioning of the mobile station, the temporal indicia identifying a time at which the mobile station is positioned at a location indicated by the positional indicia.

6. The apparatus of claim 3 wherein the historical indicia further comprises durational indicia associated with the positional indicia that identifies the positioning of the mobile station, the durational indicia identifying a durational period at which the mobile station is positioned at a location indicated by the positional indicia.

7. The apparatus of claim 2 wherein said decoder is further adapted to receive indications of hand-off of the mobile station, said decoder for again predicting the subsequent path of movement of the mobile station upon reception of the indications of the hand-off of the mobile station, the subsequent path again-predicted by said decoder forming an updated subsequent path of movement.

8. The apparatus of claim 7 wherein the indications of the hand-off of the mobile station to which said decoder is coupled to receive is embodied together with the positional indicia.

9. The apparatus of claim 7 wherein said resource requestor is further adapted to receive indications of the updated subsequent path of movement, said resource requestor further for selectably requesting updated reservation of the communication resources at the at least one target, fixed-site transceiver.

10. The apparatus of claim 1 wherein the radio communication system defines a network part, of which the plurality of spaced-apart, fixed-site transceivers form a portion, wherein said encoder is embodied at the mobile station, and said apparatus further comprising a resource reserver embodied at the network part, said resource reserver for selectably reserving the communication resources responsive to request generated by said resource requester.

11. The apparatus of claim 1 wherein said decoder and said resource reserver are both embodied at the network part.

12. The apparatus of claim 1 wherein said encoder and said decoder together form a mobility path predictor formed of a Lempel-Ziv compression and decompression algorithm, executable by processing circuitry.

13. A method of communicating in a radio communication system having a plurality of spaced-apart fixed-site transceivers positioned throughout a geographic area, each fixed-site transceiver defining a coverage area within which communications with a mobile station are permitted pursuant to a communication session in which communication resources are allocated to effectuate the communication session, said method for facilitating allocation of communication resources by at least one target, fixed-site transceiver, said method comprising:

encoding, using a variable-to-fixed encoding scheme, historical indicia associated with movement of the mobile station into compressed form;

storing the historical indicia, once encoded during said operation of encoding;

accessing and decoding the historical indicia stored during said operation of storing;

predicting a subsequent path of movement of the mobile station the subsequent path formed of a first part and a second part, the first part based upon the historical indicia and the second part based upon a current locate update, associated with movement of the mobile station decoded during said operation of decoding; and selectably reserving the communication resources at the at least one target, fixed-site transceiver to permit effectuation of the communication session, the at least one target, fixed-site transceiver defining a coverage area containing at least a portion of the subsequent path of movement predicted during said operation of predicting when the subsequent path of movement is of a prediction probability greater than a selected threshold.

14. The method of claim 13 further comprising the operation, prior to said operation of predicting, of creating and maintaining a database containing the historical indicia and wherein said operation of accessing and decoding further comprises accessing the database.

15. The method of claim 13 wherein said operations of predicting and selectably reserving are selectably repeated.

16. The method of claim 15 wherein said operations of predicting and selectably reserving are repeated upon hand-off of the mobile station.

17. The method of claim 13 wherein said operations of encoding and decoding are performed through execution of a Lempel Ziv compression and decompression algorithm.

* * * * *